US009035746B2

(12) United States Patent
Rechner et al.

(10) Patent No.: US 9,035,746 B2
(45) Date of Patent: May 19, 2015

(54) SYSTEM FOR SCREENING PEOPLE AND METHOD FOR CARRYING OUT A SCREENING PROCESS

(75) Inventors: Jörg Rechner, München (DE); Björn Brecht, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 975 days.

(21) Appl. No.: 12/738,734

(22) PCT Filed: Oct. 15, 2008

(86) PCT No.: PCT/EP2008/008990
§ 371 (c)(1), (2), (4) Date: Jul. 29, 2010

(87) PCT Pub. No.: WO2009/049918
PCT Pub. Date: Apr. 23, 2009

(65) Prior Publication Data

US 2010/0289614 A1 Nov. 18, 2010

(30) Foreign Application Priority Data

Oct. 17, 2007 (DE) ......................... 10 2007 050 024

(51) Int. Cl.
*G05B 19/00* (2006.01)
*G07C 9/00* (2006.01)
*G07B 15/00* (2011.01)

(52) U.S. Cl.
CPC ............ *G07C 9/00103* (2013.01); *G07B 15/00* (2013.01); *G07C 9/00079* (2013.01)

(58) Field of Classification Search
USPC ............. 340/5.2, 5.3, 5.6, 5.8, 5.86; 713/152, 713/185, 186; 235/375, 382; 705/5
See application file for complete search history.

(56) References Cited

U.S. PATENT DOCUMENTS

| | | | | |
|---|---|---|---|---|
| 6,363,351 | B1 | 3/2002 | Moro | |
| 8,009,873 | B2 | 8/2011 | Chapman | |
| 2003/0151493 | A1* | 8/2003 | Straumann et al. | 340/5.25 |
| 2003/0215114 | A1* | 11/2003 | Kyle | 382/115 |
| 2005/0171787 | A1* | 8/2005 | Zagami | 705/1 |
| 2005/0258238 | A1 | 11/2005 | Chapman | |
| 2006/0087439 | A1* | 4/2006 | Tolliver | 340/573.1 |

FOREIGN PATENT DOCUMENTS

| | | | |
|---|---|---|---|
| EP | 1318485 | A1 | 6/2003 |
| GB | 2418511 | A | 3/2006 |
| JP | 2005215999 | A | 8/2005 |
| JP | 2005285145 | A | 10/2005 |
| JP | 2007073040 | A | 3/2007 |
| JP | 2007179475 | A | 7/2007 |
| WO | 9606409 | A1 | 2/1996 |

* cited by examiner

*Primary Examiner* — Brian Zimmerman
*Assistant Examiner* — Laura Nguyen
(74) *Attorney, Agent, or Firm* — Laurence A. Greenberg; Werner H. Stemer; Ralph E. Locher

(57) ABSTRACT

The invention relates to a method for carrying out a screening process and a control system, comprising the following steps: Detecting an intention of a person to pass through; transmitting notification data indicating the control intention of the person and comprising data (ID data) identifying the person to a control authority; comparing the data (ID data) identifying the person to examination information of a control database and generating the check data necessary for the screening process; transmitting the check data to at least one control device of at least one control station; recording control information of the person by means of the control device; evaluating the control information based on the check data, and generating a control decision and outputting the control decision.

12 Claims, 3 Drawing Sheets

SYSTEM FOR SCREENING PEOPLE AND METHOD FOR CARRYING OUT A SCREENING PROCESS

BACKGROUND OF THE INVENTION

Field of the Invention

The invention relates to a screening system and a method for carrying out a person screening process in which persons are examined with regard to their identity and a screening decision is taken in a manner dependent on their examined identity and, if appropriate, further examination information, which screening decision generally decides about access into and/or exit from a region and/or passage through a screening station of a border.

Person screening processes are generally carried out at borders. The borders can be not only sovereign borders but also borders appertaining to operational organization, e.g. in the case of passenger screening for a domestic flight, or alternatively borders with respect to buildings or grounds. In the case of a simple known screening system and method for screening persons, an identity document of a person is examined for authenticity. An identity check with regard to the person is additionally performed on the basis of data identifying the person in the identity document. If both examinations are positive, that is to say that if the identity document is verified as genuine and correspondence between the identity of the person in the identity document and the person is additionally established, then a screening decision is taken which permits the person to pass through the border. By contrast, if one of the two examinations turns out to be negative, then the person is prevented from passing through the border.

In addition, at many borders there is a need to demarcate a group of persons who are permitted to pass through said border. Persons who, by way of example, have attracted attention as a result of criminal acts in a sovereign territory of a country and thereupon have been deported from this country are intended to be prevented, in the course of border control, from re-entering the sovereign territory of this country. Therefore, the data identifying the person are preferably also compared with examination information comprising, for example, a wanted list and/or information about deported and/or undesirable persons, etc. The group of persons who are permitted to pass through a border can also be restricted in some other way. For persons of some nationalities a visa may by necessary, for example, which is attached in the identity document.

In order to expedite processing at screening stations at the borders and to expedite detection of the data identifying the person in the identity document and to make it substantially free of errors, the identity documents have been created in which the information identifying the person is configured such that it is at least partly machine-readable, that is to say detectable by a screening device.

As a result of this, although processing at a screening station is expedited by virtue of the fact that detection of the data identifying the person which are indicated in the security document is expedited, the time required in order is required this information with respect to the examination information, which is preferably stored in a screening database, is not reduced. Therefore, long waiting times often occur at screening stations for the persons to be screened, particularly when a large number of persons wish to pass through the border at the same time or in a short period of time.

WO 96/06409A discloses a method for providing an identification of an individual, comprising: maintaining a database with identification information specific to the appearance and/or condition of an individual; providing a unique description for each individual enabling access to the individual's identification data in the database; and providing identification means adapted for portage with the individual and containing the unique description. Furthermore, a description is given of a method in which identification information is communicated from the database to a screening station, for example an airport gate, said information being used there for the person screening process.

EP 1 318 485 A1 describes a security filter system comprising a network with means for registering people, computer-aided means for storing the identities of authorized users, which are linked and to the means for registering people, and at least one network with means for verifying authorized users, which is linked to the computer-aided means for storage.

The invention addresses the technical problem of providing a screening system and a screening method with which a time required for the person screening process can be reduced, without adversely affecting a reliability of the person screening process.

The technical problem is solved according to the invention by means of a screening method comprising the features of patent claim 1 and also a screening system comprising the features of patent claim 11 according to the invention. Advantageous configurations of the invention emerge from the dependent claims.

For this purpose, a method for carrying out a person screening process is proposed, comprising the following steps: detecting a passage intention of a person; communicating notification data, which indicate the passage intention of the person and comprise data (ID data) identifying the person, at a screening entity; comparing the data (ID data) identifying the person with respect to examination information of a screening database and generating check data required for the person screening process; communicating the check data to at least one screening device of at least one screening station; detecting screening information of the person by means of the screening device; evaluating the screening information on the basis of the check data and generating a screening decision and outputting the screening decision. A passage intention is the intention of a person to want to cross a border. This intention is communicated in the form of notification data, which additionally comprise data identifying the person, to the screening entity in order to enable the latter, in the preliminary stages of screening, to effect a comparison with examination information. The examination information can comprise for example access lists, wanted lists, etc. So-called check data are generated during this comparison, said check data subsequently being required for the actual person screening process. The check data generally comprise a result of the comparison with the examination data and also at least a portion of the data identifying the person, in order to be able to assign the check data to the person at the screening station. The check data are communicated to at least one screening device of a screening station at the border that the person wishes to pass through. Consequently, upon arrival at the corresponding screening station, check data are present which comprise, inter alia, for example information about whether, on the basis of a comparison of the data identifying the person with respect to the examination information, passage through the border will be permitted or not permitted. This examination, which is generally time-intensive, can therefore already be performed in the preliminary stages before the actual screening. At the screening station, screening information of the person is detected by means of the screening device. Said screening information involves firstly information detected from the identity document in order to make it possible to assign the communicated check data to the person and to make it possible to examine the identity document, that is to say make it possible to check whether the person is the one whose identity information is stored or indicated in the identity document. Furthermore, information about the person himself/herself which makes it possible to identify the person is detected as screening information. In the simplest embodiment, the screening device can comprise for this purpose input means used by the personnel at the screening station to input information which is taken from the identity document and/or results from questioning of the person to be screened and/or comprises information perceived by the screening personnel, for example a result of a comparison between passport photograph and face. The screening information is evaluated with the aid of the check data and a screening decision is generated, which indicates, for example, whether or not the person is permitted to pass through the border. Said decision is output by the screening device. Consequently, a screening system for carrying out person screening processes comprises at least one intention detection device for detecting a passage intention of a person, a central control device of a screening entity, which is information-technologically connected to the intention detection device, such that notification data can be communicated to the screening entity, said notification data indicating a passage intention of a person and comprising the data identifying the person, a screening database—linked to the central control device—with examination information of the screening entity, wherein the central control device is designed for comparing the data identifying the person with respect to the examination information and for generating check data required for the person screening process, and at least one screening device of at least one screening station, which is information-technologically connected to the central control device in order to receive the check data, wherein the screening device comprises at least one screening information detection device for detecting screening information of the person, an evaluation device for evaluating the screening information on the basis of the check data and taking a screening decision, and an output unit for outputting the screening decision. In the case where screening personnel are used not only for monitoring the screening devices but for taking the final decision about passage through the border, the screening decision of the screening device should be regarded as a decision recommendation for the screening personnel and hence a screening recommendation.

What is achieved in the case of this screening system is that the time duration required for performing the person screening process at the screening station is significantly reduced since a comparison of the data identifying the person with respect to the examination information can already be performed after notification of the passage intention, before the person actually arrives at the screening station. Since the times for which the individual persons have to wait at the screening device of the screening station are reduced, it is possible to reduce the number of screening devices at a screening station without reducing the screening capacity of the screening station. Without a reduction of the screening devices, the screening system is able to screen an increased number of persons at a screening station. By virtue of the fact that the comparison of the data identifying the person with respect to the examination information is performed centrally, it is possible to ensure, in a simple manner, that a comparison is made in each case with respect to up-to-date examination information, provided that it is ensured that the central device has the up-to-date examination information in each case. These often sensitive data do not have to be communicated from the central control device to the screening stations. Only check data are communicated to the screening devices of the screening stations, which check data only have to comprise the result of the comparison and are thus greatly reduced with regard to the amount of said check data.

Since a passage intention by the person to be screened is intended to be detected and communicated in the simplest possible manner, in one preferred screening system it is provided that the intention detection device is information-technologically connected by means of the central control device by means of a confidence device, which comprises an ID information database and is designed, on the basis of detected notification data, to retrieve at least a portion of the data identifying the person from the ID information database and to add it to the intention data. Consequently, if the notification data are communicated by means of a confidence device, then it is advantageously provided that the latter retrieves at least a portion of the data identifying the person from an ID information database of the confidence device and adds it to the notification data. Consequently, the passage intention in the original notification data which are communicated from the intention detection device only has to comprise that information which makes it possible for the confidence device to identify the person who wishes to pass through a border. The information identifying the person which is required for the comparison with the examination data can then be retrieved from the database of the confidence device and added to the notification data, which are then communicated to the screening entity.

In one preferred embodiment of the invention, the passage intention is detected by means of an electronic communication apparatus embodied spatially separately from the screening device, in particular a mobile telephone, a personal digital assistant (PDA), a laptop, a computer or a similar apparatus. This affords the advantage that a passage intention by the person can be detected and sent in a simple manner. It can be sent as notification in particular temporally prior to arrival at the screening station, that is to say at a location that is spatially remote from the screening station.

In order to detect a passage intention by means of a mobile telephone, in one preferred embodiment it is provided that an application module, for example a module embodied as Java script, is retrieved by the confidence device, for example, and installed on the mobile telephone. With the aid of such a module, it is conveniently possible to detect the information required for a passage intention by means of the mobile telephone and at the same time to ensure completeness of the information required by the confidence device and/or the screening entity.

One embodiment of the invention requires, by way of example, items of information about the screening station to be passed and also identification formations which, by way of example, adequately identify the person and/or enable the confidence device to add this information from the ID information database to the notification data.

Particularly in the case of screening entities which utilize a large amount of and/or complex information identifying the person, for example biometric data, such as a fingerprint, a plurality of fingerprints, an iris pattern of one eye or both eyes of the person, face shape information, etc., during the screening, inputting of this information by the user is difficult or impossible and above all prone to error. Therefore, it is advantageous to send the information identifying the person to a confidence device beforehand, said confidence device subsequently adding this information from a database to the notification data. In one preferred screening system, further screening information detection units are coupled to the confidence device and can be used to detect further screening information, from which the data identifying the person can be derived and/or are derived. The further screening information can be detected directly from the person to be screened, by means of the further screening information detection units, for example. In one embodiment of the invention, therefore, it is provided that the screening information detection units and/or the further screening information detection units comprise fingerprint scanners, iris scanners, 3D person scanners, in particular face scanners, video detection units, alphanumeric detection units, voice detection, recognition, and/or analysis devices and document detection devices. The document detection devices can be all devices that are able to detect data identifying the person that have been stored in an identity document. In particular, they can therefore comprise a document scanner, a text recognition unit, RFID readers, chip readers, etc. Since the biometric data stored in chips or RFID apparatuses are protected against unauthorized readout in the case of identity documents, for example passports, the biometric data are detected directly from the person by the confidence device generally by means of the further screening detection devices. For this purpose, the confidence device will be coupled to a multiplicity of further screening information detection units that are set up in a spatially distributed fashion at different locations in order to enable persons to register themselves at the confidence device and to store their data identifying the person.

In order to have to transmit only a small amount of data after a registration during the notification of a screening intention and to ensure that only the person himself/herself can initiate addition of these data identifying the person to the notification data, in one preferred embodiment of the invention it is provided that the confidence device comprises a token generator, by means of which a token is generated during the detection of the data identifying the person and by means of which it is possible to assign the data identifying the person in the ID information database. The token can be a personal identification number (PIN), for example. In order to send notification of a passage intention with respect to a border, by means of the intention recognition device, for example a mobile telephone, only said token have to be communicated to the confidence device, on the basis of which token the confidence device can identify the person and can add the data identifying the person to the notification data.

In order to ensure that a comparison of the data identifying the person with respect to the examination information at the screening entity indeed takes place temporally prior to the actual screening, but as temporally close to the screening as possible, in order to ensure that the comparison takes place with respect to examination data that are as up-to-date as possible, the screening entity will prescribe a time window which adapted is adapted to the processing duration of the notification data. As a general rule, the time window will be dimensioned such that the person to be screened is already en route to the screening station when said person sends notification of the passage intention.

In one preferred development of the invention it is provided that the at least one screening station or a group of screening stations from a totality of screening stations are automatically determined on the basis of the detected passage intention and/or information about the transmission of the notification data and the check data are communicated only to the screening devices of these screening stations or the screening devices of the group of screening stations. If the passage intention is detected by means of a mobile telephone, by way of example, then the position of the mobile telephone can be determined from the communication data of the mobile telephone with the mobile telephone network operator. This information can be added to the notification data, with the result that the confidence device can determine the spatially closest screening stations. If the passage intention is detected by means of a computer on a ferry, for example, then it is possible to determine therefrom, on the basis of the destination port of the ferry, the screening station at which the person wishes to pass through the border.

In particular at sovereign borders of countries having a multiplicity of screening stations, it is difficult to ensure that the person screening processes are carried out to the same standard in each case at all the screening stations. Furthermore, it is difficult, on account of the large number of different identity documents that are produced in the different countries, to keep available in each case the most up-to-date information about the individual types of identity document and also the methods for checking and verifying the authenticity of said identity documents at the individual screening stations. In order to solve this problem, therefore, it is proposed to provide the central device of the screening entity with a so-called passage control table database, in which screening-relevant information is stored. The latter can be used to correctly configure the comparison of the data identifying the person with the examination data. Consequently, a comparison of the notification data is expediently effected depending on the information of the passage control table database.

In a further preferred embodiment of the invention it is provided that the central control device is designed to add passage control table data to the check data. Consequently, the information of the passage control table database which is relevant to the respective screening process is communicated to the respective screening station at which the actual screening process is performed. This ensures that a screening process in accordance with the centrally defined examination standard is performed at the respective screening station.

In a particularly preferred development of the invention it is provided that the screening device is designed to be controlled and/or configured by means of the passage control table data communicated in the check data during the detection and evaluation of the screening information. In this way, it is possible to centrally control the screening processes depending on a current threat situation and/or depending on a concrete screening situation. If the security situation changes, then the check data can be altered centrally and the screening of the person at the screening station can be controlled and influenced by this means. If a normal danger situation is present, for example, then it may be provided that only specific identification features of the person are detected and evaluated as screening information. It is likewise possible for only specific security features of the identity document to be detected and verified. If, by contrast, the security situation changes, then what can be achieved by means of a simple change of the passage control table data added to the check data is that more and/or other identification features of the person are detected as screening information and other or more security features of the identity document are detected and verified. It is likewise conceivable for the type of evaluation and/or verification of the individual identification features and/or security features to be performed in a different way. The quality of the person screening processes can thereby be significantly increased. Even if a portion of the features identifying the person has to be detected for example by means of an alphanumeric detection unit, in particular a keyboard, with the aid of an employee of the screening institution, what can be achieved on the basis of the passage control table data is that the screening device requests the employee to input the correct identification features and thus ensure a uniform standard in every case and for every security document by comparison with a screening process customary heretofore. This relieves the burden on the employees of the screening institution and reduces an expenditure in respect of training the employees since the check information necessary for the respective screening process is indicated to said employees in a manner assisted by the screening device, for example by instructions being displayed on an output device of the screening device.

Other embodiments can comprises a plurality of screening entities and/or a plurality of confidence devices. A large screening entity can furthermore comprise a plurality of central control devices and passage control table databases and screening databases with items of examination information which are in each case kept synchronized with one another. This makes it possible to achieve a higher processing throughput and a redundancy with regard to a fail-safe constitution of one of the central control devices or one of the databases.

The screening decision can be output in a form such that it can be used for actuating barrier means which deny or allow access to a region and/or exit from a region. The outputting can be effected in the form of an information-technologically processable signal, in particular. It is thus possible to establish fully automatic unmanned screening devices at screening stations. If appropriate, a human screening person can be used to monitor the screening devices of the screening station.

The invention is explained in more detail below on the basis of preferred exemplary embodiments with reference to a drawing, in which:

DESCRIPTION OF THE INVENTION

Figure 1A:
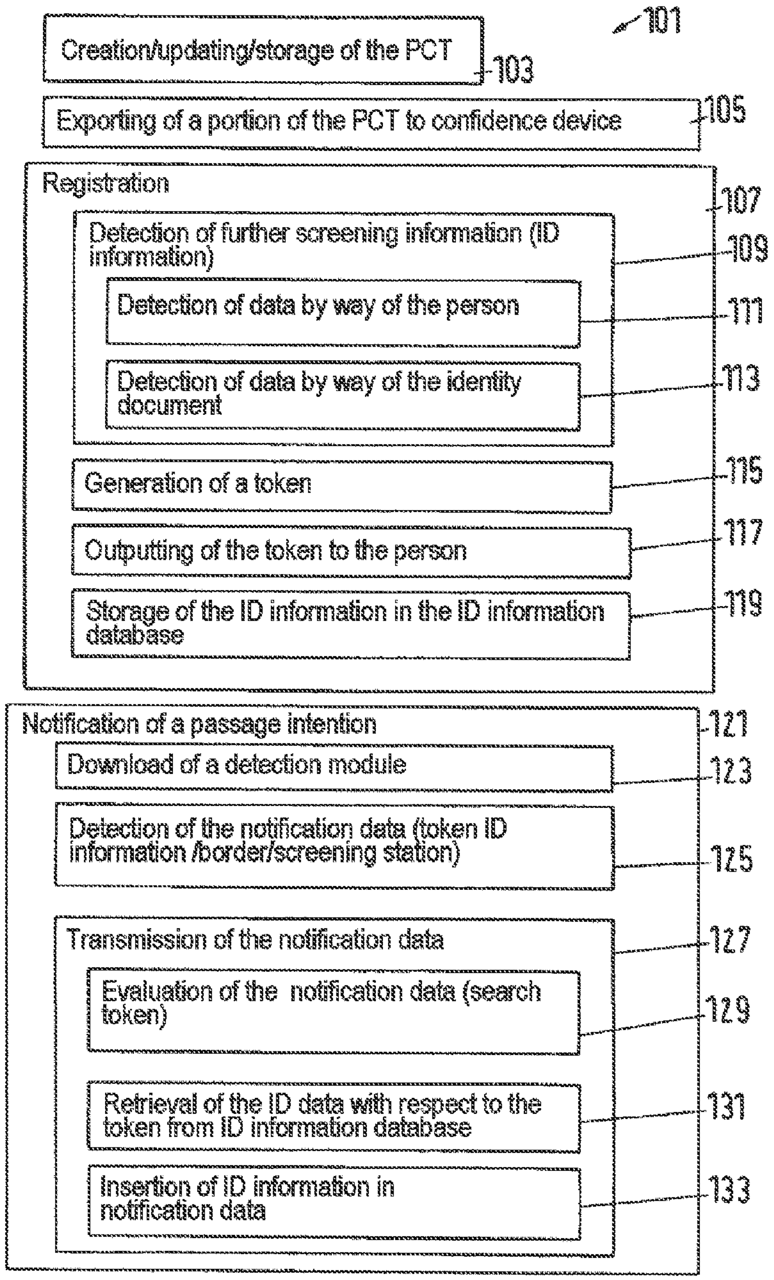
FIGS. 1*a* and 1*b* show a schematic flow chart of a method for carrying out a person screening process.
Figure 1B:
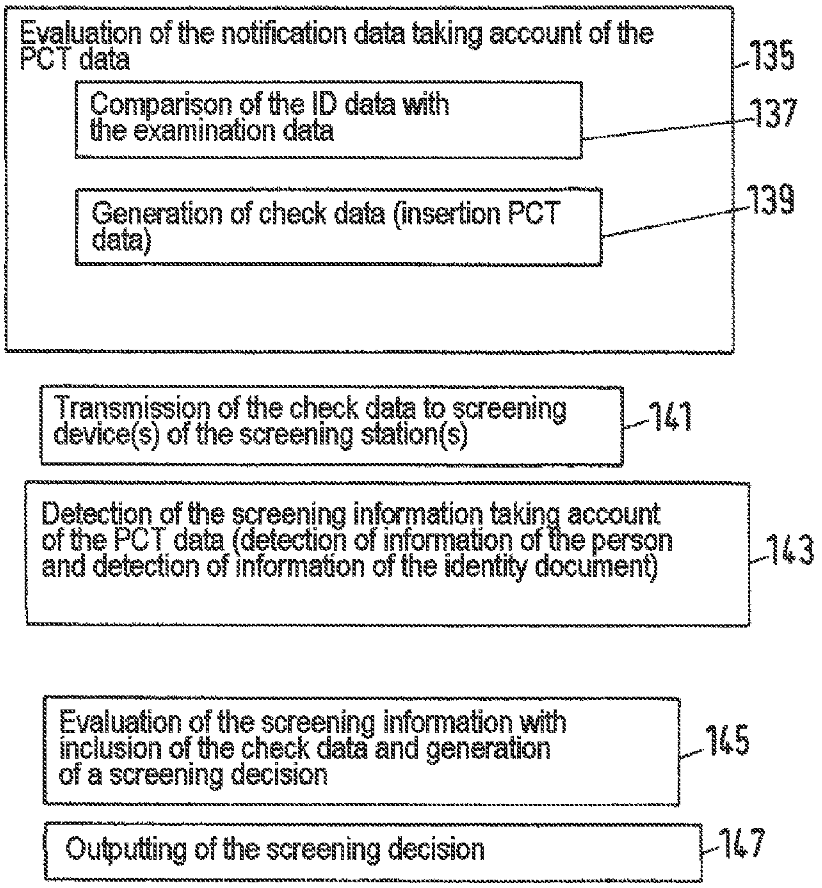

A preferred screening process will be explained below with reference to FIGS. 1*a* and 1*b*, which illustrate a schematic flow chart of a method 101 for carrying out a person screening process, and FIG. 2, which schematically illustrates a screening system 1. In the exemplary embodiment described, a person 3 interacts with the screening system 1 at three different points in time $t_1$, $t_2$ and $t_3$. A decision as to whether or not the person 3 is permitted to pass through a border 5 is taken by a screening entity 7. If the border 5 is a country border, for example, then the screening entity 7 will be a sovereign institution, for example in Germany the Federal Border Guard, the police, customs or the military. If the border is an operational border or, for example, the border of a sports ground or of a factory site, some other institution may be involved which is responsible for processing persons at this border.

Said screening entity 7 defines those criteria which have to be satisfied in order that the person 3 is permitted to pass through the border 5. At the same border 5 said criteria can be different for different persons 3 and at different times. The direction from which the person 3 approaches the border 5 can likewise be of importance. If the border 5, which is a country border for example, is intended to be passed through at an airport, then the criteria can depend on the entry country of the person. A general danger situation can likewise influence the criteria which the person 3 has to satisfy in order to be permitted to pass through the border 5. All this information is combined in a so-called passage control table (PCT).

Information about identity documents, which the persons who want to pass through the border 5 can themselves carry, is furthermore stored in said passage control table (PCT), which is preferably stored in a passage control table database 9. Said identity documents can be, for example, passports, personal proof of identity, identity cards, driving licenses, factory identification passes, etc. In general, the identity document will be a so-called security document. Security documents are considered to be those documents which comprise one or more security features which are intended to make it more difficult or impossible to duplicate and/or falsify information stored in the identity document by comparison with simple copying. The information stored in the identity document generally includes, inter alia, a name, a date of birth, a place of birth, a place of residence, a nationality, a height, an eye color, a skin color, a sex designation, a graphical representation of the person assigned to the identity document, in particular a passport photograph, biometric data of the person assigned to the identity document, for example fingerprint data, iris information, face information, etc. In addition to the information identifying the person to whom the identity document is assigned, identity documents often also comprise information identifying the identity document itself, for example an identification number, characteristic security features, etc.

In the case of security documents it is customary for only a portion of the security features to be publically disclosed, in order to make it more difficult for the identity document to be forged and/or duplicated by unauthorized entities. In order, however, to allow a screening entity to carry out a verification with regard to the authenticity of the identity document, the screening entity has to be provided with the necessary information as to what security features are contained in the individual identity documents and how the latter can be examined and verified with regard to their authenticity. All this information is additionally contained in the passage control table PCT.

Furthermore, in one preferred embodiment, information defining individual examination scenarios, for example depending on the entry country, the security situation, etc., is added to the passage control table PCT. Furthermore, for the individual security scenarios, instructions and/or control information items are present on the basis of which the screening devices 13 at screening stations 15 of the screening entity 7 can perform screening processes at the border 5. In the exemplary method, method step 103 combines the creation and updating of the PCT as one method step.

The passage control table PCT is published by the screening entity preferably in extracts in order, by way of example, to make the person 3 aware of which identity document should be carried in which of the passage scenarios. For the person 3 it may be sufficient, for example, in the case of entry from a country A, to carry an identity document comprising no machine-readable biometric data. In the case of entry from the country B, by contrast, when passing through the same border 5, it may be necessary for the identity document 11 to be one which comprises machine-readable biometric data of the person.

Figure 2:
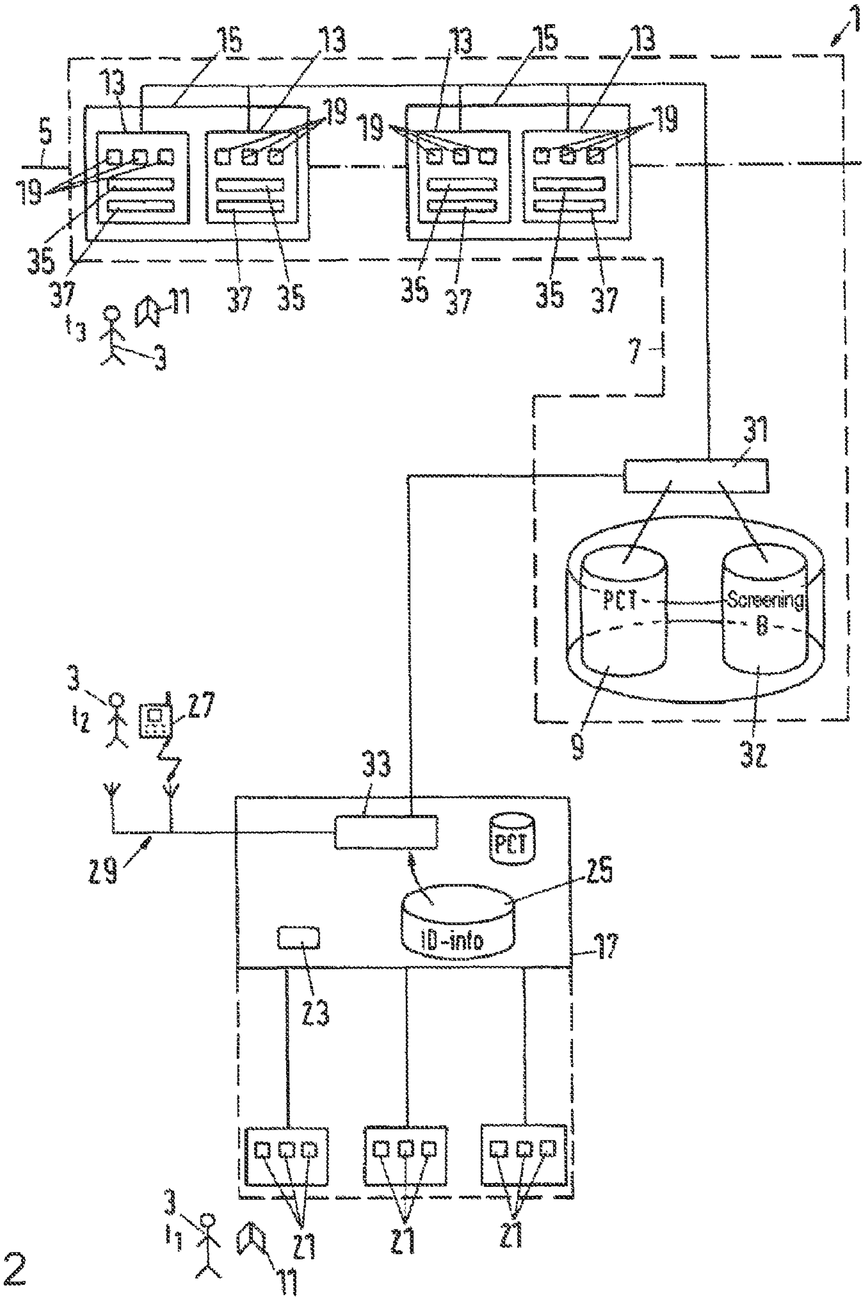
FIG. 2 shows a schematic illustration of a screening system.

In the case of the screening system 1 illustrated in FIG. 2, a portion of the passage control table 9 is therefore exported or made accessible 105 to a confidence device 17, preferably electronically. The confidence device 17 is an institution to which the person 3 transfers, temporally prior to passing through the border 5 at a point in time $t_1$, the data identifying said person 3 for fiduciary management. This means that the person 3 registers with the confidence device 17, as is indicated in method step 107. In the course of registration, those data which can be evaluated and/or examined during a process of screening the person at the border 5 are detected 109. These are generally the items of information which are stored in the identity document 11 by means of printing technology, holo-graphically, electronically and/or in some other way. For reasons of data protection and, in particular, maintaining security against forgery, these data are at least partly coded in the identity document 11 and/or secured against retrieval of the data. Therefore, in general it will not be possible for the confidence device 17 to read out the data identifying the person completely from the identity document 11. The complete detection of the information stored in the identity document 11 will be reserved for screening detection units 19 of the screening devices 13 at the screening stations 15. However, further screening detection units 21 are preferably coupled to the confidence device 17, which units can detect features and data identifying the person. In the same way as the screening detection units 19, the further screening detection units 21 can comprise all possible devices which are suitable for detecting 113 the person 3 himself/herself or the latter's features 111, the identity document 5 and/or the information stored therein. By way of example, the screening detection units 19 and further screening detection units 21 can comprise optical scanners, 3D scanners, text recognition systems, image recognition systems, holography readers, barcode readers, fingerprint scanners, video cameras, iris scanners, etc., and also systems with which further information can be detected. These further systems can comprise, for example, a terminal having a keyboard and/or a mouse, a trackball, a joystick or the like and also voice detection and recognition and/or analysis units.

In the course of a typical registration of the person 3, therefore, a portion of the data identifying the person is detected from the ID document 11, in which for example the data of a machine-readable zone (MRZ) are detected by means of a corresponding reader. Furthermore, by way of example, one or more fingerprints are detected, an iris scan of one or both eyes is performed, a face structure is detected by means of a 3D face scanner, and/or individual items of information identifying the person, for example a name, a first name, a birth name, a place of birth, a date of birth, a nationality, a sex, a skin color, an eye color, etc., are input and/or detected by means of an input device. What items of information are to be detected and how they are to be detected are revealed for example by the portion of the passage control table PCT which has been communicated to the confidence device 17. Furthermore, information which is of relevance only for passing through a specific border and/or only in a specific period of time can also be detected during the registration. Such information or data can concern for example a visa or the like. In order to have the effect that a registration is performed as completely as possible, the detection of the data identifying the person becomes by means of the further screening information detection devices 21 on the basis of the PCT data communicated to the confidence device 17. The PCT data are preferably used for controlling the screening device 13.

In order to be able to assign the detected data identifying the person 3 to the person 3 in a simple manner and to prevent a third party from being able to gain access to the data identifying the person 3 in an unauthorized manner, a token is generated 115 during the registration. The token is output 117 to the person 3. This can take place 117 for example in electronic form by means of a transmission by e-mail and/or SMS or the like to a communication device of the person 3. The information identifying the person is stored 119 with the token in an ID information database 25. The person performs such a registration with the confidence device 17 at the point in time $t_1$. Provided that no information necessary for a single passage process, such as a visa for example, is required for passing through the border 5, this registration is performed once and can be used for any desired number of passages through the border 5 and/or further borders.

If direct passage through the border 5 by the person 3 is imminent, then the person 3 notifies 121 the screening entity 7 of this passage intention at the point in time $t_2$ (notification), which succeeds the point in time $t_1$ and precedes a screening process at the screening station 15 at the point in time $t_3$.

In order to send notification of the passage intention, the person 3 uses an intention detection device 27. The latter is preferably embodied as a communication device assigned to the person 3. The intention detection device 27 can be, for example, a mobile telephone, a personal digital assistant PDA, a personal computer, but also communication devices which are not directly assigned to the person 3, a public telephone, a public computer, a fax machine, a specific terminal for notification of border passage intentions, etc. If the intention detection device 27 is embodied as a mobile telephone, for example, then the person 3 can preferably retrieve 123 a detection module, embodied in Java script, for example, from the confidence device 17. Execution of this module on the mobile telephone instructs the person 3 to input the information required to complete the passage intention. The intention detection module is preferably formulated by the confidence device 17 such that it uses the PCT data communicated to the confidence device 17 in order completely detects 125 the information required for passing through a border. If the person 3 has registered with the confidence device 17, only a small amount of data identifying the person 3, for example the token, has to be indicated. For a concrete passage intention it may be necessary and sufficient, for example, to indicate the country from which entry is intended to take place, to indicate the screening station 15 at which the border 5 is intended to be passed through, and the token by means of which the data identifying the person 3 can be found in the ID information database 25.

From the mobile telephone, notification data comprising the passage intention and the data identifying the person, here the token, are communicated 127 to the screening entity 7. The communication is effected for example by means of a mobile telephone operator 29, which is illustrated here schematically by means of stylized reception antennas, and the confidence device 17, which is information-technologically connected to a central control device 31 of the screening entity 7. During the communication of the notification data, a notification data evaluation unit 33 of the confidence device 17, which can be embodied by means of a process-controlled computer, evaluates 129 the notification data, in this case analyzes the token and inserts 133 the data identifying the person 3 which are linked with the token, said data being retrieved 131 from the ID information database 25, into the notification data. In this case, preferably only the data identifying the person 3 are inserted into the notification data which are required, in accordance with the PCT data communicated to the confidence device 17, by the screening entity 7 in order to prepare for passage through the border 5. This expediently limits the data volume of the notification data communicated to the screening entity 7.

In order to expediently prepare for a process of screening the person at the screening station 15, the central control device 31 evaluates 135 the notification data taking account of the data contained in the passage control table PCT. In this case, the data identifying the person are compared 137 inter alia with examination information, which comprises information about wanted persons, for example. The examination information is stored in a screening database 32. If the person 3 is listed as a wanted person in a wanted list, for example, then in the course of this comparison attention would be drawn to the fact that this person is wanted by a state authority. As a result of the comparison, check data are generated 139, which are communicated 141 to the screening devices 13 of the screening station 15. The check data comprise all those items of information which are required for a screening process at the border 5. In one preferred embodiment, those PCT data of the passage control table which are required for controlling the screening devices and/or for supporting a correct regulated screening process at the screening station are therefore added to the check data. The check data will furthermore comprise a result of the comparison with respect to the examination data and also preferably at least a portion of the data identifying the person, in order to be able to assign the check data to the person 3 at the screening station 15.

At a point in time $t_3$, which temporally succeeds the points in time $t_1$ and $t_2$, the person 3 is screened at the screening station 15 prior to passing through the border 5. In this case, from the person 3 and generally also from the identity document 11, features are detected 143 as screening information by means of the screening information detection units 19. The detection is effected by means of the screening information detection units 19 of the screening device 13 preferably in an automated fashion and/or in a controlled fashion on the basis of the PCT data communicated with the check data. These define what features of the person are to be detected and in what way, and also what features of the identity document 11 are to be detected and how they are to be verified. Individual detection steps and/or screening and verification steps may require assistance by screening personnel (not illustrated). By way of example, a correspondence of an identity of a person between the data identifying the person which are communicated by the confidence device 17 and the person 3 can be effected on the basis of a passport photograph represented on an output device, the data of which passport photograph have been communicated to the screening entity 7 by the confidence device 17. The identity comparison between this communicated passport photograph and the person and, if appropriate, additionally a passport photograph in the identity document 11 can be performed by such screening personnel and a result of this identity check can be detected by means of a keyboard, a switch and/or any other detection device, for example including a voice recognition device. Afterward, the screening information detected is evaluated 145 together with the check data and, if appropriate, PCT data contained therein, in order to derive a screening decision. The screening decision is taken by an evaluation device 35 and output 147 by means of an output unit 37. In the case of an unmanned screening device, the screening decision can also be output by means of an electronic signal being output, for example, which releases a mechanical barrier device (not illustrated), such that the person 3 can pass through the border 5 provided that the screening decision has turned out to be positive with regard to a passage permission. Otherwise, the negative screening decision is output acoustically, optically or in some other way to the person 3.

If screening personnel who monitor access to or exit from a region are used at the screening station, then the screening decision of the screening device should be regarded as a screening recommendation or decision recommendation for the screening personnel. The passage decision is taken by the screening personnel in such a case.

The described method and the described screening system 1 afford the advantage that the time required at the point in time $t_3$ for the actual screening of the person 3 at the screening station 15 can be significantly reduced since a comparison of the data identifying the person with the examination information and obtaining of the possibly required PCT data indicating how the security features of the identity document 11 are to be verified and/or read out are already communicated or take place temporally prior to the screening process of the screening station 15 or screening device 13. In the case of screening stations 15 having a plurality of screening devices 13, it may be provided that the persons 3 who have sent notification of their border crossing are processed with preference. By way of example, it is possible to provide individual screening devices 13 which are permitted to be used only by persons 3 who have previously registered or sent notification for passage through the border 5. The other persons have to wait at a different screening device during the time required to perform the comparison of the data identifying the person 3 with the examination data during the screening process at the point in time $t_3$. For a given number of screening devices 13, by means of the system according to the invention, the time required for the process of screening the individual persons can be reduced and a larger number of persons can thus be screened in the same period of time. Otherwise, for the same number of screened persons, the number of screening devices required can thus be reduced.

In another embodiment of the invention it may be provided that, in the notification data, that is to say during the detection of the passage intention, the concrete screening station does not have to be detected, rather the latter are determined automatically by the confidence device 17 and/or the screening entity 7 on the basis of the information obtained when the notification data are communicated. If a mobile telephone is used as an intention detection device, then the location of the person 3 can be deduced on the basis of the transmission mast by means of which the notification data are detected. Since a notification has to take place in a certain temporal window prior to the actual screening process at the border 5, the screening station 15 or the group of screening stations 15 to which the person 3 will move with high probability in order to pass through the border 5 can be determined from the position of the person 3 at the point in time $t_2$ of the notification and from geographical information about the screening stations 15.

For the person skilled in the art it goes without saying that both the screening system 1 and the method 101 described can be modified and extended. Particularly with regard to the method 101 described it should be noted that not all the method steps described are necessary in the specified order or at all in order to be able to advantageously implement the method according to the invention.

LIST OF REFERENCE SYMBOLS

1 Screening system
3 Person
$t_1$-$t_3$ Points in time
5 Border
7 Screening institutions
9 Passage control table database

11 ID document
13 Screening device
15 Screening station
17 Confidence device
19 Screening detection device
21 Further screening detection device
23 Token generator
25 ID information database
27 Intention detection device
29 Mobile telephone operator
31 Central control device
32 Screening database
33 Notification data evaluation unit
35 Evaluation device
37 Output unit
101 Method
103 Creation/updating/storage of the passage control table (PCT)
105 Exporting/provision of a portion of the PCT (e.g. communication to confidence device)
107 Registration
109 Detection of further screening information (ID Information)
111 Detection of data by way of the person
113 Detection of data by way of the identity document
115 Token generation
117 Outputting of the token to the person
119 Storage of the ID information in the ID information database
121 Notification of the passage intention
123 Retrieval of a detection module
125 Detection of the notification data
127 Transmission of the notification data
129 Evaluation of the notification data (search token)
131 Retrieval of the ID data with respect to the token from ID information database
133 Insertion of ID information in notification data
135 Evaluation of the notification data taking account of the PCT data
137 Comparison of the ID data with the examination data
139 Generation of check data (insertion PCT data)
141 Transmission of the check data to screening device(s) of the screening station(s)
143 Detection of the screening information taking account of the PCT data
145 Evaluation of the screening information with inclusion of the check data and generation of a screening decision
147 Outputting of the screening decision

The invention claimed is:

1. A person screening method, which comprises:

detecting a person's intention to pass;

communicating notification data, which indicate a screening intention of the person and comprise data identifying the person, to a screening entity;

comparing, at a central control device of the screening entity, the data identifying the person with respect to examination information of a screening database and, at the central control device of the screening entity, generating check data required for the person screening process, the check data comprising a comparison result and at least a portion of the data identifying the person;

storing the following in a passage control table database: information about security features of identity documents to be checked, information about screening steps necessary for examining the security features, instructions for screening steps to be performed during the person screening process in a manner dependent on a screening situation, and/or control instructions for controlling a screening device during the person screening process; and adding passage control table data to the check data defining what features of the person are to be detected and in what way, and also what features of an ID document of the person are to be detected and how they are to be verified;

communicating the generated check data with the added passage control table data from the central control device to at least one screening device of at least one screening station that is separated from the central control device;

detecting screening information of the person using the at least one screening device based on the received generated check data with the added passage control table data, the screening information comprising features detected from the person and features detected from an ID document;

evaluating, at the screening station that is separated from the central control device of the screening entity, the screening information on the basis of the received generated check data with the added passage control table data and generating a screening decision at the screening station; and outputting the screening decision;

wherein, during communication of the notification data to the screening entity, the notification data are first sent to a confidence device that retrieves at least a portion of the data identifying the person from an ID information database of the confidence device and adds the portion of the data identifying the person from the ID information database to the notification data and subsequently communicates the notification data to the central control device of the screening entity, wherein the confidence device does not belong to the screening entity.

2. The method according to claim 1, which comprises detecting the screening intention with an electronic communication apparatus embodied spatially separately from the screening device.

3. The method according to claim 2, which comprises detecting the screening intention with a mobile telephone, a PDA, a laptop, or a computer.

4. The method according to claim 1, which comprises detecting the data identifying the person with the confidence device temporally prior to, and separately from, detecting the screening intention, and storing the data identifying the person in the ID information database.

5. The method according to claim 4, which comprises, during the detection of the data identifying the person, for the confidence device, detecting further screening information of the person and deriving therefrom the data identifying the person.

6. The method according to claim 5, which comprises, during the detection and/or storage of the data identifying the person, generating a token by way of which it is possible to assign the data identifying the person in the ID information database, and during the detection of the screening intention, detecting the token and inserting the token into the notification data.

7. The method according to claim 1, which comprises automatically determining the at least one screening station or a group of screening stations from a totality of screening stations on a basis of the detected screening intention and/or information about the transmission of the notification data and communicating the generated check data with the added passage control table data only to the screening devices of the determined at least one screening station or the group of screening stations.

8. The method according to claim 1, which comprises communicating at least a portion of a passage control table information to the confidence device, and wherein the confidence device selects a portion, desired by the screening entity, of the data identifying the person from the data stored in the ID information database and inserts the portion into the notification data, such that only the required portion of the data identifying the person is communicated to the screening entity.

9. A screening system for carrying out person screening processes, comprising:

at least one intention detection device for detecting a screening intention of a person;

a central control device of a screening entity, said central control device being information-technologically connected to said intention detection device for enabling notification data to be communicated to said screening entity, said notification data indicating a screening intention of the person and including data identifying the person;

said central control device of said screening entity including a passage control table database storing screening-relevant information about security features of identity documents to be checked, information about screening steps necessary for examining the security features, instructions for screening steps to be performed during the person screening process in a manner dependent on a screening situation, and/or control instructions for controlling a screening device during the person screening process;

a screening database linked to said central control device and containing examination information of said screening entity, wherein said central control device is configured to compare the data identifying the person with respect to the examination information of said screening database and for generating check data required for the person screening process, the check data comprising a result of the comparison and at least a portion of the data identifying the person; and wherein said central control device is configured to add passage control table data to the check data defining what features of the person are to be detected and in what way, and also what features of an ID document of the person are to be detected and how they are to be verified;

at least one screening device of at least one screening station that is separated from said central control device and that is information-technologically connected to said central control device in order to receive the generated check data with the added passage control table data generated at said central control device, said at least one screening device including at least one screening information detection device for detecting screening information of the person based on the received generated check data with the added passage control table data;

an evaluation device at said screening station being separated from said central control device of the screening entity that is connected to said screening device for evaluating the screening information on a basis of the received generated check data with the added passage control table data and making a screening decision at said screening station;

an output unit for outputting the screening decision; and a confidence device not belonging to said screening entity, said confidence device connecting said intention detection device to said central control device, said confidence device including an ID information database and being configured, on a basis of detected and received notification data, to retrieve at least some data identifying the person from the ID information database and to add the at least some data identifying the person to intention data prior to passing the intention data to said central control device of said screening entity.

10. The screening system according to claim 9, wherein said confidence device comprises a token generator, configured to generate a token during a detection of the data identifying the person and enabling assignment of the data identifying the person in the ID information database, and wherein the detected notification data comprise the token, on the basis of which the confidence device retrieves the data identifying the person from the ID information database and adds the data to the notification data.

11. The screening system according to claim 9, wherein a comparison of the notification data with the screening database is performed depending on the information of the passage control table database.

12. The screening system according to claim 9, wherein said screening device is controlled and/or configured by way of the passage control table data communicated in the generated check data with the added passage control table data during a detection and evaluation of the screening information.

* * * * *